United States Patent [19]
Blackburn et al.

[11] Patent Number: 5,944,135
[45] Date of Patent: *Aug. 31, 1999

[54] SEAT BELT BUCKLE WITH FIELD EFFECT LOCKING INDICATOR AND METHOD OF USE

[75] Inventors: Brian K. Blackburn, Rochester; Scott B. Gentry, Romeo; Robert Sayles, Rochester; Charles E. Steffens, Jr., Washington, all of Mich.

[73] Assignees: TRW Vehicle Safety Systems Inc.; TRW Inc., both of Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,949

[22] Filed: Nov. 14, 1996

[51] Int. Cl.$^6$ .................................................. B60R 21/00
[52] U.S. Cl. ............................................................ 180/268
[58] Field of Search ................................... 180/268, 269, 180/270

[56] References Cited

U.S. PATENT DOCUMENTS

| | | | |
|---|---|---|---|
| 3,588,811 | 6/1971 | Prickett | 340/457.1 |
| 3,766,612 | 10/1973 | Hattori | 200/61.58 B |
| 3,770,919 | 11/1973 | Lewis | 200/61.58 B |
| 3,934,671 | 1/1976 | Hart | 180/270 |
| 4,103,842 | 8/1978 | Martin et al. | 242/384 |
| 4,571,471 | 2/1986 | Haglund | 200/61.58 B |
| 4,574,911 | 3/1986 | North | 180/270 |
| 4,943,087 | 7/1990 | Sasaki | 280/804 |
| 5,060,977 | 10/1991 | Saito | 280/802 |
| 5,107,846 | 4/1992 | Atlas | 128/666 |
| 5,123,498 | 6/1992 | Alcidi et al. | 180/268 |
| 5,181,773 | 1/1993 | Colvin | 362/75 |
| 5,233,732 | 8/1993 | Yamanishi | 24/303 |
| 5,406,252 | 4/1995 | Dear | 340/457.1 |
| 5,483,221 | 1/1996 | Mutter et al. | 340/457.1 |
| 5,590,904 | 1/1997 | Ellis et al. | 180/268 |
| 5,752,299 | 5/1998 | Vivacqua et al. | 24/633 |

FOREIGN PATENT DOCUMENTS

| | | |
|---|---|---|
| 212425 | 8/1984 | Germany . |
| 4214222A1 | 4/1993 | Germany . |
| 62-189250 | 12/1986 | Japan . |
| 2228183 | 8/1990 | United Kingdom . |

OTHER PUBLICATIONS

Research Disclosure for Seat Belt Buckle Switch, p. 193, 38333, (1996) Mar. XP 000581332, No. 383 Emsworth GB.

Research Disclosure for Air Bag Inhibitor for Use with Infant Seat, p. 940, 34457, (1992) Dec., XP 000327165, No. 344 Emsworth GB.

Primary Examiner—Kenneth R. Rice
Attorney, Agent, or Firm—Tarolli, Sundheim, Covell, Tummino & Szabo

[57] ABSTRACT

A seat belt buckle (12) includes a latch mechanism (20) and a field effect device (26). The latch mechanism (20) includes a latch (42) which is movable into and out of a locking position in which it engages a seat belt tongue (16) to interlock the tongue (16) with the latch mechanism (20). The field effect device (26) provides a first output if the seat belt tongue (16) is not interlocked with the latch mechanism (20) and provides a second, different output if the seat belt tongue (16) is interlocked with the latch mechanism (20).

12 Claims, 6 Drawing Sheets

SEAT BELT BUCKLE WITH FIELD EFFECT LOCKING INDICATOR AND METHOD OF USE

FIELD OF THE INVENTION

The present invention relates to a seat belt buckle.

BACKGROUND OF THE INVENTION

A seat belt system for restraining a vehicle occupant typically includes seat belt webbing, a seat belt locking tongue on the webbing, and a seat belt buckle. The tongue on the webbing is inserted and locked in the buckle to secure the webbing about a vehicle occupant. Such a seat belt system may also include a buckle switch for indicating whether or not the tongue is locked in the buckle.

SUMMARY OF THE INVENTION

In accordance with one aspect of the present invention, an apparatus comprises a latch mechanism and field effect means. The latch mechanism includes a latch which is movable into and out of a locking position. When the latch is in the locking position, it engages a seat belt tongue to interlock the tongue with the latch mechanism. The field effect means provides a first output if the latch is not in the locking position, and provides a second, different output if the latch is in the locking position. Accordingly, the output of the field effect means indicates whether or not a seat belt tongue is interlocked with the latch mechanism.

In accordance with another aspect of the present invention, an apparatus comprises a latch mechanism and a field effect means in the form of a photosensitive device. The latch mechanism releasably interlocks with a seat belt tongue. The photosensitive device provides a first output if a seat belt tongue is interlocked with the latch mechanism. The photosensitive device provides a second, different output if a seat belt tongue is interlocked with the latch mechanism.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
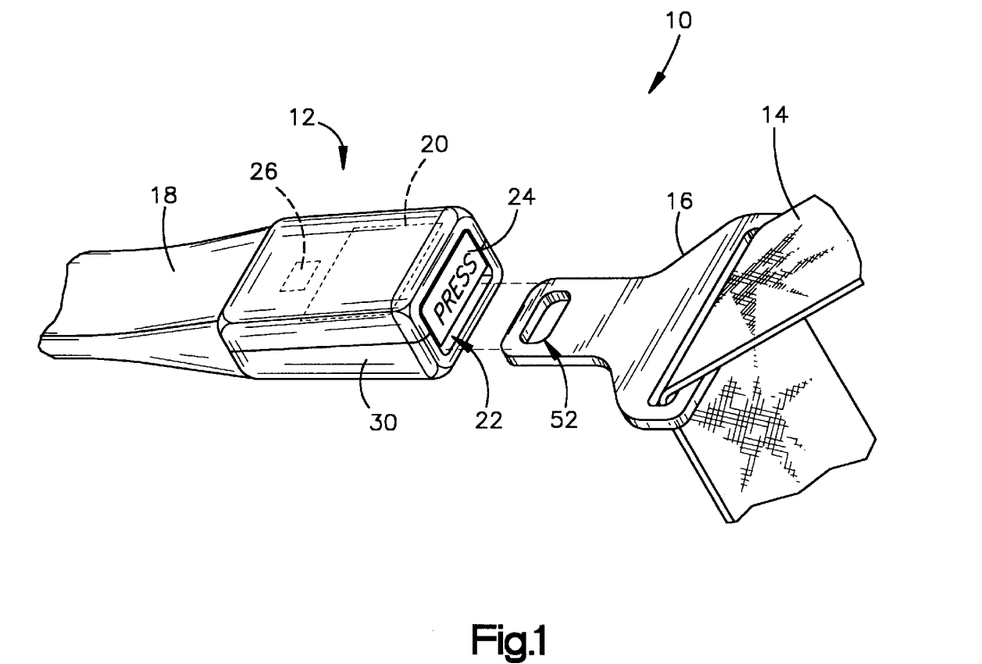
FIG. 1 is an isometric view of a vehicle occupant restraint apparatus comprising a first embodiment of the present invention.

A vehicle occupant protection apparatus 10 comprising a first embodiment of the present invention is shown partially in FIG. 1. The apparatus 10 includes a seat belt buckle 12, seat belt webbing 14, and a seat belt tongue 16 on the webbing 14. The buckle 12 is anchored in a vehicle in a known manner, such as by a cable or anchor strap (not shown) extending within a cover 18. A latch mechanism 20 (shown schematically) locks the tongue 16 in the buckle 12 when the tongue 16 is moved into an opening 22 at the end of the buckle 12. The tongue 16 is subsequently released from the buckle 12 upon depression of a pushbutton 24 adjacent to the opening 22.

In accordance with the present invention, a field effect device 26 (also shown schematically) is located within the buckle 12. The field effect device 26 has a first output when the tongue 16 is not locked in the buckle 12 and has a second, different output when the tongue 16 is locked in the buckle 12. Accordingly, the output of the field effect device 26 indicates whether or not the tongue 16 is locked in the buckle 12.

The buckle 12 includes a housing 30. The latch mechanism 20 is contained in the housing 30, and may comprise any structure capable of releasably interlocking with the tongue 16 in cooperation with the pushbutton 24. There are many different buckle latch mechanism designs that can be used in accordance with the present invention. This design is shown for purposes of illustration by way of example only. As shown schematically in FIGS. 2–4, the latch mechanism 20 has a plurality of known parts including the pushbutton 24, an ejector 40 and a latch 42.

Figure 2:
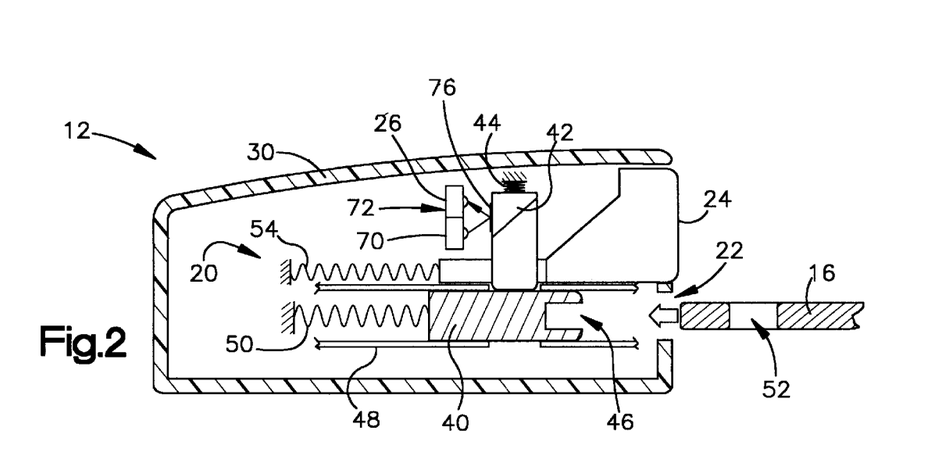
FIG. 2 is a side view, partly in section, of parts of the apparatus of FIG. 1, with certain parts being shown schematically.
Figure 3:
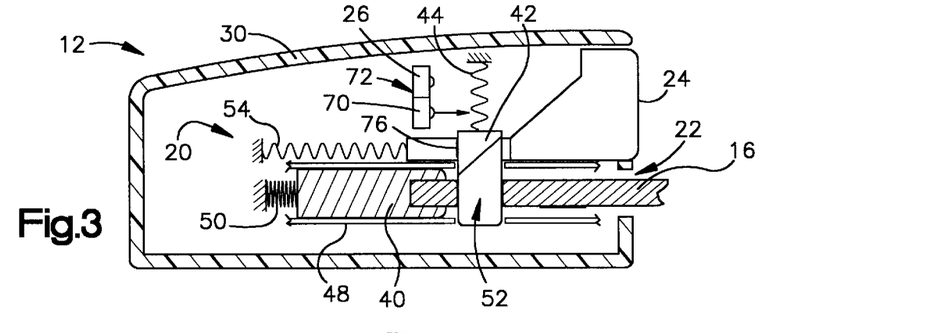
FIGS. 3 and 4 are views similar to FIG. 2 showing parts in different positions.

The latch 42, which is sometimes referred to as a locking bar, locking element, or the like, is movable between a non-locking position (FIG. 2) and a locking position (FIG. 3). When the tongue 16 is located outside the buckle 12, as shown in FIG. 2, the ejector 40 holds the latch 42 in the non-locking position against the bias of a latch spring 44.

When the tongue 16 is inserted through the opening 22, as indicated by the arrow shown in FIG. 2, it is moved into engagement with the ejector 40 in a notch 46 at the end of the ejector 40. The tongue 16 is then moved inward against the ejector 40 so as to push the ejector 40 along a guide track 48 from a forward position (FIG. 2) to a rearward position (FIG. 3) against the bias of an ejector spring 50.

As the tongue 16 and the ejector 40 approach the positions of FIG. 3, an aperture 52 in the tongue 16 moves into alignment with the latch 42. The latch spring 44 then moves the latch 42 to the locking position through the aperture 52 in the tongue 16. As a result, the latch 42 blocks removal of the tongue 16 from the buckle 12 when the latch 42 is in the locking position. The tongue 16 is thus interlocked with the latch mechanism 20 when the tongue 16 is moved into the buckle 12 to the position of FIG. 3.

Figure 4:
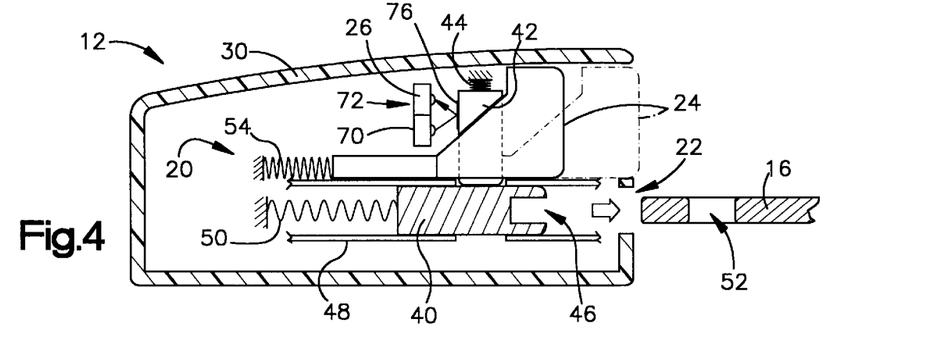

When the tongue 16 is to be released from the buckle 12, the pushbutton 24 is moved from the position of FIGS. 2 and 3 to the position of FIG. 4 against the bias of a pushbutton spring 54. The pushbutton 24 engages, or may be linked with, the latch 42 in a known manner so as to move the latch 42 back out of the aperture 52 in the tongue 16 against the bias of the latch spring 44. The ejector spring 50 then moves the ejector 40 back outward along the guide track 48 toward the opening 22 to eject the tongue 16 from the buckle 12.

As shown schematically in FIGS. 2–4, the housing 30 contains the field effect device 26, and further contains a field source device 70 for controlling the field effect device 26. In the first embodiment of the present invention, the field effect device 26 is a photosensitive device and the field source device 70 is a source of light. Other embodiments of the present invention could use alternative field source devices to control corresponding alternative field effect devices. For example, a source of a magnetic field could be used to control a Hall effect device. A source of a capacitive or other electrical field could be used to control any suitable electrically conductive device such as a field effect transistor. In each case, the output of the controlled device is affected in accordance with the present invention by the applied field intensity rather than by contact input to indicate whether or not a tongue is locked in a corresponding buckle.

The source 70 of light preferably is a light emitting diode (LED). The photosensitive device 26 preferably is a phototransistor. The phototransistor 26 and the LED 70 could be separate components, but are most preferably included in the buckle 12 as integral parts of a unitary photoreflector system 72. Such a photoreflector system is known in the art, and may comprise, for example, Hammamatsu part no. HA5589.

Figure 16:
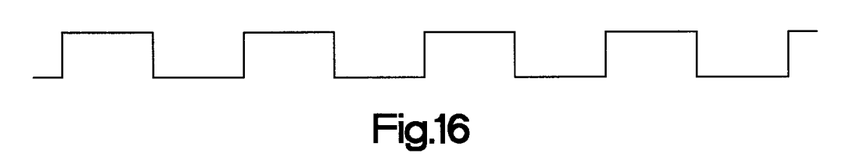
FIGS. 16 and 17 are graphic examples of signals that are provided in accordance with the present invention.
Figure 17:
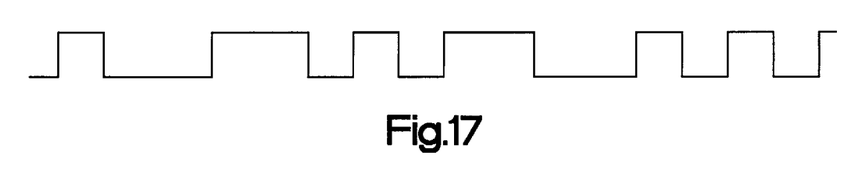

The LED 70 is normally energized so as to emit light, i.e., to generate a light field, continuously when the vehicle is being operated. The LED 70 may alternatively be energized so as to emit light intermittently, such as by flashing, or by remaining on under certain vehicle conditions or for a predetermined time. More specifically, the LED 70 can be pulsed on and off such that a specified code can be modulated on the switch signal. This could be as simple as a 50% duty cycle at a fixed frequency, as shown in FIG. 16, or a more elaborate data communication scheme such as Frequency Shift Keying technique (FSK) or Phase Shift Keying technique (PSK), each of which is shown in FIG. 17.

As further shown schematically in FIG. 2, a reflective surface 76 on the latch 42 reflects light from the LED 70 to the phototransistor 26 when the latch 42 is in the non-locking position. The latch 42 can be polished to provide the reflective surface 76. The reflective surface 76 can alternatively be defined by a structure mounted on or applied to the latch 42. Such a structure could comprise, for example, a coating, a film, or a layer of reflective material such as chrome plating. In any case, the reflective surface 76 subjects the phototransistor 26 to an applied light field of a first, relatively high intensity when the latch 42 is in the non-locking position. The phototransistor 26 thus has a first output if the tongue 16 is not locked in the buckle 12. The phototransistor 26 preferably has a continuous output, with the first output being a high-level output.

When the tongue 16 is locked in the buckle 12, as shown in FIG. 3, the latch 42 is located in the locking position. The latch 42 is then spaced from the photoreflector system 72 such that the reflective surface 76 no longer reflects light from the LED 70 to the phototransistor 26. As a result, the phototransistor 26 is subjected to an applied light field of a second, relatively low intensity. The phototransistor 26 thus has a second, low-level output if the tongue 16 is locked in the buckle 12.

Figure 5:
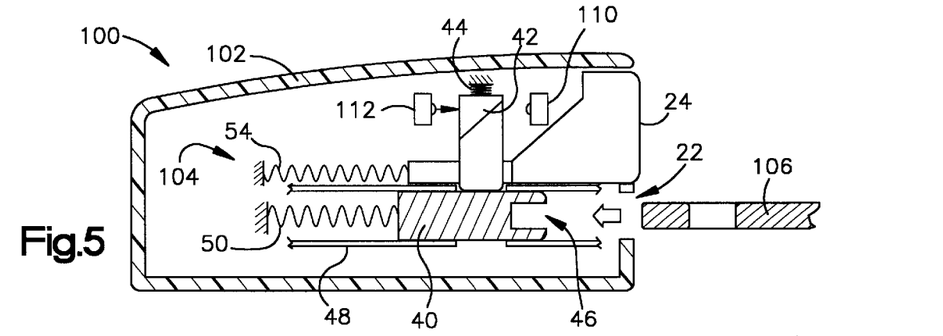
FIG. 5 is a view similar to FIG. 2 showing parts of a vehicle occupant restraint apparatus comprising a second embodiment of the present invention.
Figure 6:
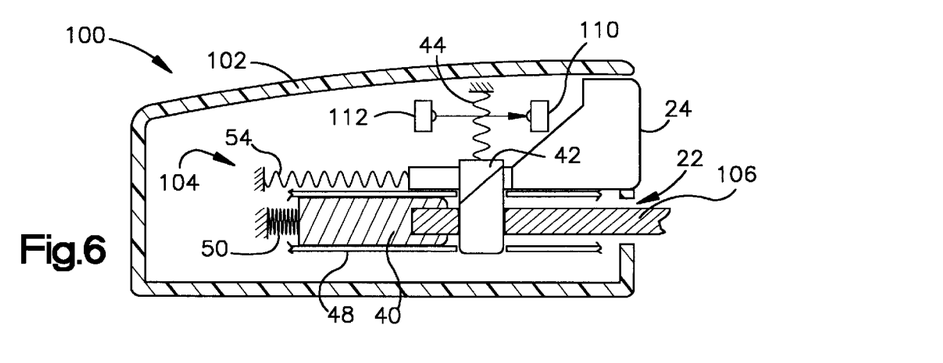
FIG. 6 is a view of the parts shown in FIG. 5, with certain parts being shown in different positions.

A second embodiment of the present invention is shown partially in FIGS. 5 and 6. The partial views of the second embodiment shown in FIGS. 5 and 6 correspond with the partial views of the first embodiment shown in FIGS. 2 and 3. Like the first embodiment, the second embodiment includes a seat belt buckle 100 with a housing 102 containing a latch mechanism 104 for releasably interlocking with a seat belt tongue 106. The latch mechanism 104 preferably is the same as the latch mechanism 20 described above. This is indicated by the use of the same reference numbers for corresponding parts of the latch mechanisms 20 and 104.

The housing 102 further contains a field effect device 110 and a field source device 112. As in the first embodiment of the present invention described above, the field effect device 110 in the second embodiment preferably is a phototransistor, and the field source device 112 preferably is an LED. However, the phototransistor 110 and the LED 112 in the second embodiment are separate parts that face oppositely toward each other across the path of movement of the latch 42.

When the latch 42 in the second embodiment is in the non-locking position, as shown in FIG. 5, it blocks transmission of light from the LED 112 to the phototransistor 110, i.e., it shields the phototransistor 110 from the light field generated by the LED 112. When the latch 42 is in the locking position, as shown in FIG. 6, it does not block transmission of light from the LED 112 to the phototransistor 110. Accordingly, the phototransistor 110 is not energized by light emitted from the LED 112 when the latch 42 is in the non-locking position, and is energized by light emitted from the LED 112 when the latch 42 is in the locking position. The phototransistor 110 thus has a first output if the tongue 106 is not locked in the buckle 100, and has a second, different output if the tongue 106 is locked in the buckle 100.

Figure 7:
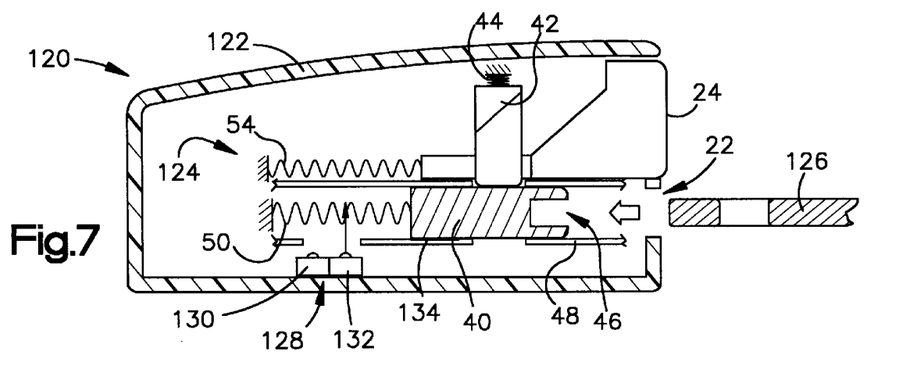
FIG. 7 is a view similar to FIG. 2 showing parts of a vehicle occupant restraint apparatus comprising a third embodiment of the present invention.
Figure 8:
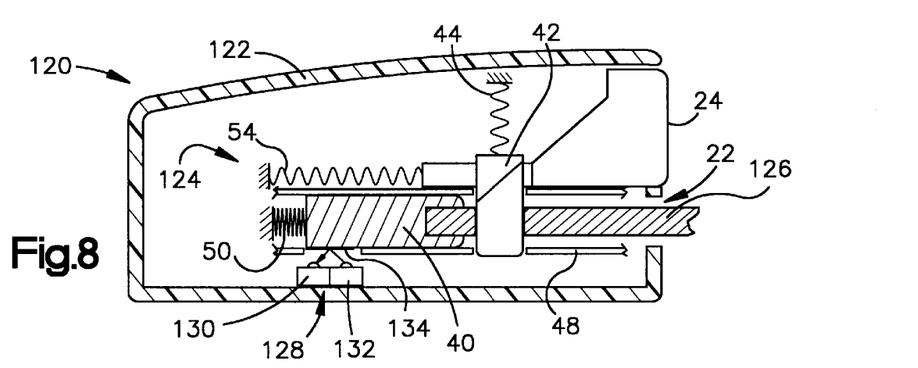
FIG. 8 is a view of the parts shown in FIG. 7, with certain parts being shown in different positions.

A third embodiment of the present invention is shown partially in FIGS. 7 and 8. In the third embodiment, a seat belt buckle 120 has a housing 122 containing a latch mechanism 124 which, as indicated by further use of the same reference numbers, has parts that releasably interlock with a seat belt tongue 126 in the same manner as described above with reference to FIGS. 2–4. The housing 122 further contains a field effect apparatus in the form of a photoreflector system 128. The photoreflector system 128 includes a field effect device in the form of a phototransistor 130, and includes a field source device in the form of an LED 132. The phototransistor 128 and the LED 130 together face across the path of movement of the ejector 40 between its forward position (FIG. 7) and its rearward position (FIG. 8).

The ejector 40 in the third embodiment has a reflective surface 134 like the reflective surface 76 described above. When the ejector 40 is in the forward position, the reflective surface 134 is spaced from the photoreflector system 128 and does not reflect light from the LED 132 to the phototransistor 130. When the ejector 40 is in the rearward position, the reflective surface 134 faces the photoreflector system 128 so as to reflect light from the LED 132 to the phototransistor 130. Accordingly, the phototransistor 130 has a first output if the tongue 126 is not locked in the buckle 120 and has a second output which differs from the first output if the tongue 126 is locked in the buckle 120.

Figure 9:
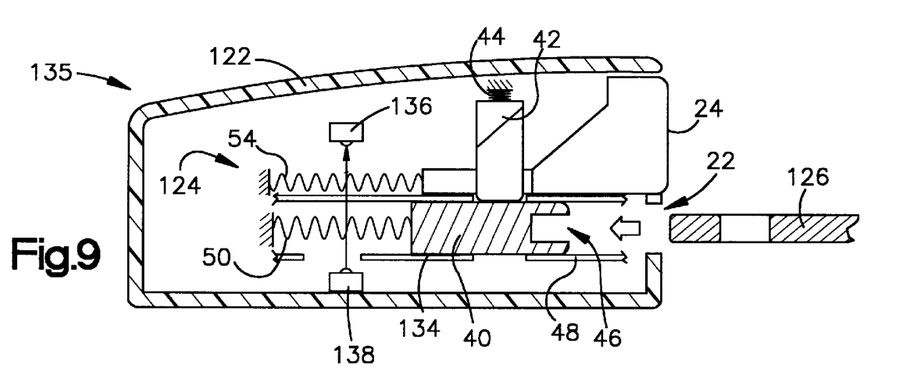
FIG. 9 is a view similar to FIG. 2 showing parts of a vehicle occupant restraint apparatus comprising a fourth embodiment of the present invention.

As shown in FIG. 9, a fourth embodiment of the present invention includes a buckle 135 which is similar to the buckle 120 shown in FIGS. 7 and 8. The buckle 135 contains a field effect device in the form of a phototransistor 136, and further contains a field source device in the form of an LED 135. The ejector 40 in the buckle 136 has a forward position, as shown in FIG. 9, and has a rearward position which corresponds to the rearward position of the ejector 40 shown in FIG. 8. The LED 138 and the phototransistor 136 face each other across the path of movement of the ejector 40 between its forward and rearward positions.

When the ejector 40 is in its forward position, as shown in FIG. 9, it does not block transmission of light from the LED 138 to the phototransistor 138. When the ejector 40 is in its rearward position, it is interposed between the LED 138 and the phototransistor 136 so as to block transmission of light from the LED 138 to the phototransistor 136. Accordingly, the phototransistor 136 has a first output when the corresponding tongue 126 is located outside of the buckle 135, and has a second, different output when the tongue 126 has moved the ejector 40 to the rearward position upon locking of the tongue 126 in the buckle 135.

As thus far described, the present invention uses a movable part of a latch mechanism to switch a field effect device between first and second predetermined conditions by varying the applied field intensity in response to locking and unlocking of a seat belt tongue in a corresponding buckle. The latch is the preferred part of the latch mechanism for performing this function. This is because the latch provides the most definite indication that the tongue is locked in the corresponding buckle. However, the tongue also may be used to vary the applied field intensity in accordance with the invention. Fifth and sixth embodiments of the invention use a tongue in this manner, as shown in FIGS. 10 and 11, respectively.

Figure 10:
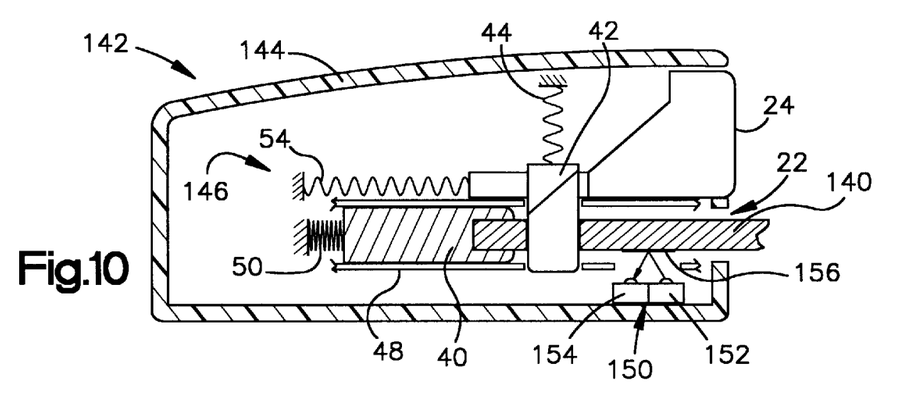
FIG. 10 is a view similar to FIG. 2 showing parts of a vehicle occupant restraint apparatus comprising a fifth embodiment of the present invention.

FIG. 10 shows a tongue 140 locked in a buckle 142. The buckle 142 has a housing 144 containing a latch mechanism 146 like the latch mechanisms described above. The housing 144 further contains a field effect apparatus in the form of a photoreflector system 150. The photoreflector system 150 includes an LED 152 and a phototransistor 154 which together face across the path of movement of the tongue 140 in the housing 144.

When the tongue 140 is moved into the housing 144 to the locked position of FIG. 10, a reflective surface 156 on the tongue 140 moves besides the photoreflector system 150 to reflect light from the LED 152 to the phototransistor 154. The tongue 140 then switches the phototransistor 154 from a first predetermined condition to a second predetermined condition by reflecting light from the LED 152 to the phototransistor 154. The phototransistor 154 thus has a first output if the tongue 140 is not locked in the buckle 142, and has a second, different output if the tongue 140 is locked in the buckle 142.

Figure 11:
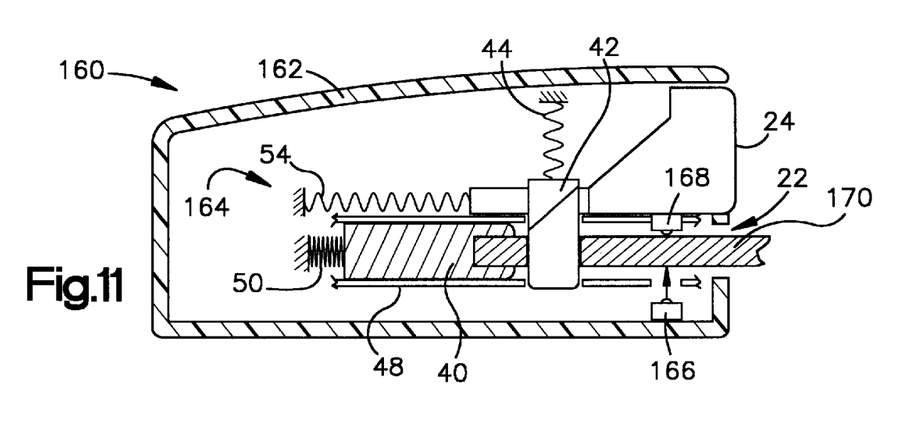
FIG. 11 is a view similar to FIG. 2 showing parts of a vehicle occupant restraint apparatus comprising a sixth embodiment of the present invention.

FIG. 11 shows another buckle 160 with a housing 162 containing a latch mechanism 164 like the latch mechanisms described above. The housing 162 further contains a field effect apparatus in the form of an LED 166 and a phototransistor 168 which face each other across the path of movement of a tongue 170 in the buckle 160. When the tongue 170 is moved into the housing 162 to the locked position of FIG. 10, it moves between the LED 166 and the phototransistor 168 to block transmission of light from the LED 166 to the phototransistor 168. The tongue 170 thus switches the phototransistor 168 from a first predetermined condition to a second predetermined condition. Accordingly, the LED 168 has a first output if the tongue 170 is not locked in the buckle 160 and has a second, different output if the tongue 170 is locked in the buckle 160.

Each field effect device described above can be used in accordance with the present invention to alert a vehicle occupant to the locked or unlocked condition of the corresponding tongue and buckle. For example, a lamp or audible alarm on the vehicle instrument panel could be activated in response to the output of the field effect device to alert a vehicle occupant if the tongue is not locked in the buckle.

The field effect devices can also be used in accordance with the present invention to control deployment of one or more vehicle occupant protection devices. For example, as shown schematically in the block diagram of FIG. 12, a field effect device 180 in a seventh embodiment of the present invention is included in a deployment system 182 with an inflatable vehicle occupant protection device 184. The field effect device 180 provides an output indicating whether or not a tongue is locked in a corresponding buckle (not shown) in the same manner as any one of the field effect devices described above. The deployment system 182 further includes a crash sensor 186, a controller 188, and a source 190 of inflation fluid. A vent assembly 192 is interposed between the source 190 of inflation fluid and the inflatable device 184.

Figure 12:
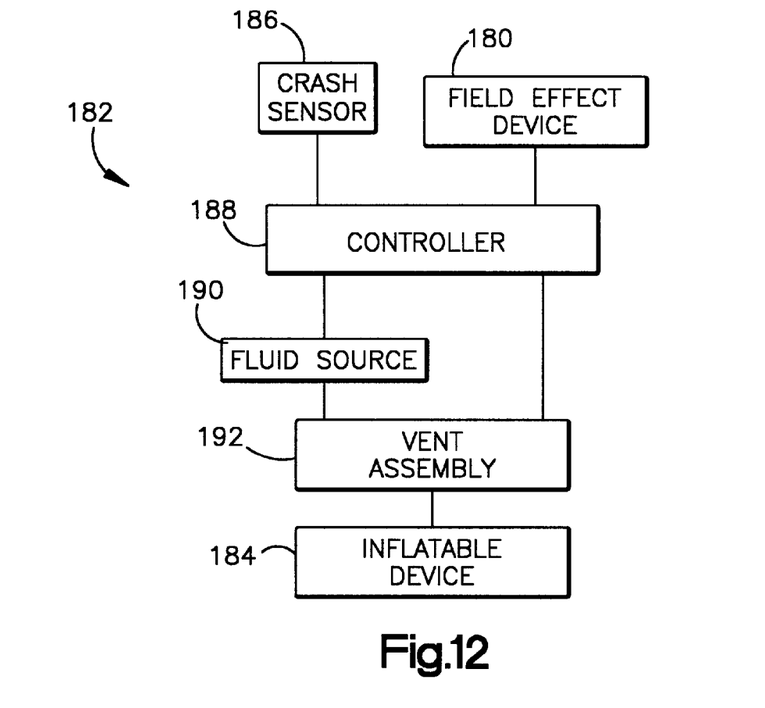
FIG. 12 is a schematic view of a deployment system comprising a seventh embodiment of the present invention.

The inflatable device 184 can be any one of several different types of inflatable vehicle occupant protection devices known in the art. Such inflatable devices include, for example, air bags, inflatable seat belts, inflatable knee bolsters, inflatable head liners, and knee bolsters operated by air bags.

The crash sensor 186 may comprise any known apparatus for sensing a vehicle condition that indicates the occurrence of a crash. The crash-indicating condition may comprise, for example, sudden vehicle deceleration that is caused by a crash. If the crash-indicating condition is at or above a predetermined threshold level, it indicates the occurrence of a crash or other event for which deployment of the inflatable device 184 is desired to help protect an occupant of the vehicle. The crash sensor 186 then provides a deployment signal to the controller 188.

When the controller 188 receives a deployment signal from the crash sensor 186, it responds by actuating the fluid source 190 to initiate inflation of the inflatable device 184. The controller 188 further responds to the output of the field effect device 180 by operating the vent assembly 192 in accordance with the locked or unlocked condition of the corresponding tongue and buckle. If the output of the field effect device 180 indicates that the tongue is not locked in the buckle, the controller 188 directs the vent assembly 192 to vent a first amount of inflation fluid away from the inflatable device 184. The inflatable device 184 is then deployed in a first mode for protection of a vehicle occupant who is not being restrained by the corresponding seat belt webbing. If the output of the field effect device 180 indicates that the tongue is locked in the buckle, the controller 188 directs the vent assembly 192 to vent a second, different amount of inflation fluid away from the inflatable device 184. The inflatable device 184 is then deployed in a second, different mode for protection of a vehicle occupant who is being restrained by the seat belt webbing.

Figure 13:
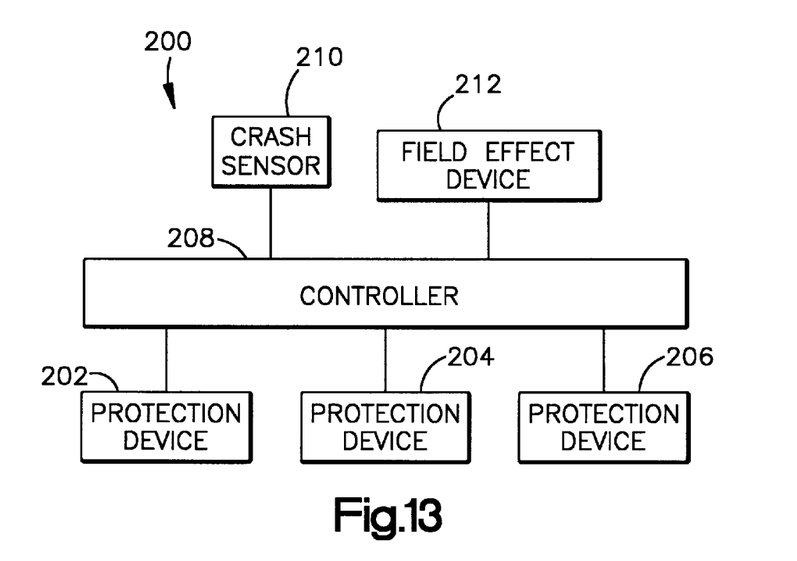
FIG. 13 is a schematic view of a deployment system comprising an eighth embodiment of the present invention.

An eighth embodiment of the present invention is shown partially in the block diagram of FIG. 13. The eighth embodiment comprises another example of a deployment system that can be operated in differing modes in accordance with the present invention. The eighth embodiment thus comprises a deployment system 200 for a plurality of vehicle occupant protection devices 202, 204 and 206. In addition to the protection devices 202, 204 and 206, the deployment system 200 includes a controller 208, a crash sensor 210, and a field effect device 212 in accordance with the present invention. Like the field effect devices described above, the field effect device 212 provides a first output when a seat belt tongue is not locked in a corresponding buckle and provides a second, different output when a seat belt tongue is locked in the buckle.

Each of the protection devices 202, 204 and 206 can be an inflatable device, a seat belt pretensioner, a seat belt retractor lock, or any other device that is deployed for protection of a vehicle occupant. When the controller 208 receives a deployment signal from the crash sensor 210, it deploys one or more of the protection devices 202, 204 and 206 in a first mode if the field effect device 212 provides the first output. The controller 208 deploys one or more of the protection devices 202, 204 and 206 in a second, different mode if the field effect device 212 provides the second output.

Each mode of deployment for the protection devices 202, 204 and 206 may comprise simultaneous or sequential deployment of the protection devices 202, 204 and 206 with a predetermined timing. Each mode of deployment may alternatively comprise deployment of less than all of the protection devices 202, 204 and 206. For example, if the protection devices 202, 204, and 206 include a pretensioner, a retractor lock, or another device that functions to help control tension in the seat belt webbing, it may be preferable not to deploy that device if the field effect device 212 indicates that the tongue is not locked in the buckle. Moreover, if the protection devices 202, 204 and 206 include an inflatable device, each mode of deployment may comprise the use of one or more vent assemblies like the vent assembly 192 described above with reference to FIG. 12. The first and second deployment modes could also differ from each other by the use of a fluid source that operates in different stages to provide inflation fluid in correspondingly different amounts (with or without venting) or at correspondingly different times, and/or by providing multiple sources of inflation fluid which are operative selectively.

Figure 14:
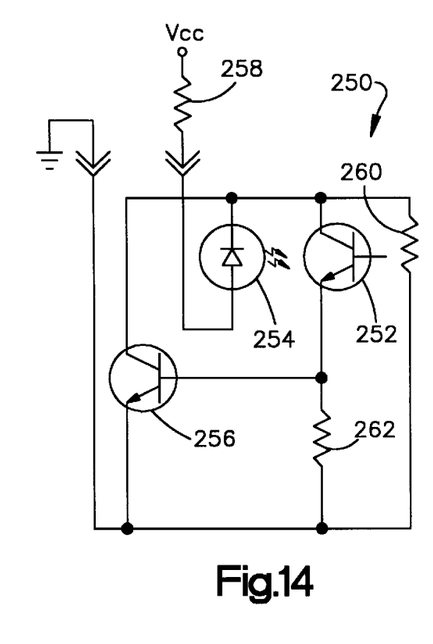
FIG. 14 is a schematic view of an electrical circuit that can be used in accordance with the present invention.

FIG. 14 is a schematic view of an electrical circuit 250 that can be used to operate a field effect device in accordance with the present invention. The circuit 250 includes a field effect device in the form of a phototransistor 252, and a field source in the form of an LED 254. The phototransistor 252 is energized by light emitted from the LED 254 in accordance with the locked or unlocked condition of a corresponding seat belt buckle and seat belt tongue, as described above.

The circuit 250 further includes a buffer transistor 256 and a "pull-up" resistor 258. The pull-up resistor 258 ordinarily carries a low level bias current. The voltage drop across the pull-up resistor 258 ordinarily has a correspondingly low value. The bias current flows to ground through the LED 254 and a resistor 260.

If the seat belt tongue is locked in the buckle, the collector-base junction of the phototransistor 252 reaches its respective threshold voltage (0.65V) under the influence of light emitted from the LED 254. The phototransistor 252 then provides a collector current output which flows to ground through an emitter resistor 262. This output of the phototransistor 252 causes the base-emitter junction of the buffer transistor 256 to turn on, and thus causes the buffer transistor 256 also to provide a collector current sunk to ground and flowing through the pull-up resistor 258. In this manner, locking of the tongue in the buckle causes the total current flowing through the circuit 250 to increase to a level greater than the level of the bias current. The voltage drop across the pull-up resistor 258 increases accordingly. The voltage drop across the pull-up resistor 258 thus indicates the locked or unlocked condition of the seat belt tongue and buckle.

In accordance with a particular feature of the present invention, the voltage drop across the pull-up resistor 258 can be used for diagnosis of the circuit 250. If the circuit 250 is shorted, the voltage drop across the pull-up resistor 258 will be Vcc. If the circuit 250 is open, i.e., there is no bias current, the voltage drop across the pull-up resistor 258 will equal zero volts.

Figure 15:
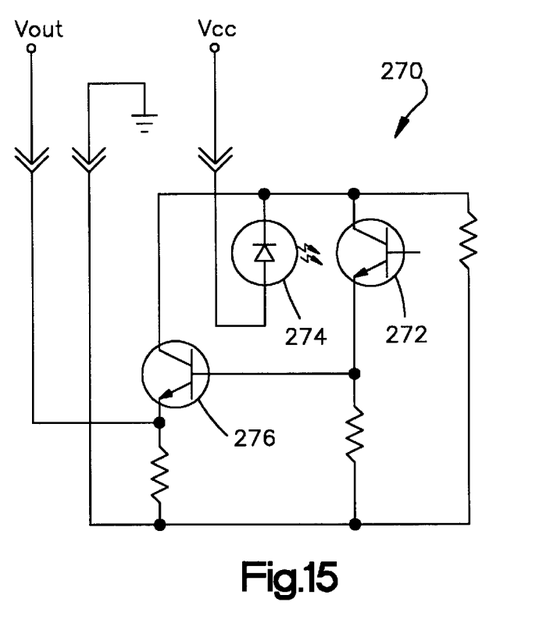
FIG. 15 is a schematic view of another electrical circuit that can be used in accordance with the present invention.

Another electrical circuit 270 that can be used in accordance with the present invention is shown schematically in FIG. 15. The circuit 270 also includes a field effect device in the form of a phototransistor 272, a field source device in the form of an LED 274, and a buffer transistor 276. However, instead of using the voltage drop across a pull-up resistor like the pull up resistor 258 of FIG. 14, the circuit 270 uses the voltage drop across the emitter of the buffer transistor 276 to indicate the condition of the phototransistor 272, and thereby to indicate the locked or unlocked condition of a corresponding seat belt tongue and buckle.

From the above description of the invention, those skilled in the art will perceive improvements, changes and modifications. For example, each source of light in the preferred embodiments of the invention is an LED adjacent to the corresponding photosensitive device. Any other suitable source of light, such as an incandescent bulb, could be used in accordance with the invention. Moreover, the source of light could be remote from the photosensitive device, and could be coupled with a fiber optic or other illuminating structure for transmitting light to the photosensitive device. Such improvements, changes and modifications within the skill of the art are intended to be covered by the appended claims.

Having described the invention, the following is claimed:

1. Apparatus comprising:

a latch mechanism which releasably interlocks with a seat belt tongue;

a photosensitive device which responds to said latch mechanism by providing a first output if a seat belt tongue is not interlocked with said latch mechanism and a second, different output if a seat belt tongue is interlocked with said latch mechanism; and a source of light which energizes said photosensitive device;

said latch mechanism including a movable part having a first position reflecting said light form said source to said photosensitive device and a second position not reflecting said light from said source to said photosensitive device, said latch mechanism moving said movable part from one of said positions to the other of said positions in response to interlocking of a seat belt tongue with said latch mechanism.

2. Apparatus as defined in claim 1 wherein said movable part of said latch mechanism is an ejector.

3. Apparatus as defined in claim 1 further comprising a vehicle occupant protection device which deploys upon the occurrence of a predetermined vehicle condition, said protection device deploying in a first mode in response to said first output and in a second, different mode in response to said second output.

4. Apparatus as defined in claim 1 further comprising a vehicle occupant protection device which deploys upon the occurrence of a predetermined vehicle condition if said photosensitive device is providing one of said outputs, and which does not deploy if said photosensitive device is providing the other of said outputs.

5. Apparatus comprising:

a latch mechanism which releasably interlocks with a seat belt tongue; and a photosensitive device which responds to said latch mechanism by providing a first output if a seat belt tongue is not interlocked with said latch mechanism and a second, different output if a seat belt tongue is interlocked with said latch mechanism; and a source of light which energizes said photosensitive device;

said latch mechanism including an ejector having a first position blocking transmission of said light from said source to said photosensitive device and a second position not blocking transmission of said light form said source to said photosensitive device, said latch mechanism moving said ejector from one of said positions to the other of said positions in response to interlocking of a seat belt tongue with said latch mechanism.

6. Apparatus comprising:

a seat belt buckle including a housing containing a latch mechanism which is releasably interlockable with a seat belt tongue in said buckle;

a photosensitive device in said housing;

a source of light; and a switching apparatus which varies transmission of light from said source to said photosensitive device so as to switch said photosensitive device between first and second predetermined conditions upon interlocking of said latch mechanism with a seat belt tongue in said buckle;

said switching apparatus comprising a reflective surface with a first position reflecting said light from said source to said photosensitive device and a second position not reflecting said light from said source to said photosensitive device, said reflective surface being supported for movement from one to the other of said positions upon interlocking of said latch mechanism with said seat belt tongue in said buckle.

7. Apparatus as defined in claim 6 wherein said reflective surface is a surface of a structure mounted on a movable part of said latch mechanism.

8. Apparatus as defined in claim 7 wherein said movable part of said latch mechanism is an ejector.

9. Apparatus comprising:

a seat belt buckle including a housing containing a latch mechanism which is releasably interlockable with a seat belt tongue in said buckle;

a photosensitive device in said housing;

a source of light; and switch means for responding to said latch mechanism by varying transmission of light from said source to said photosensitive device so as to switch said photosensitive device between first and second predetermined conditions in response to interlocking of said latch mechanism with a seat belt tongue in said buckle;

said source of light and said photosensitive device being integral parts of a unitary photo reflector system located in said housing.

10. Apparatus comprising:

a latch mechanism which releasably interlocks with a seat belt tongue, said latch mechanism including an ejector that moves from a first position to a second position in response to interlocking of the seat belt tongue with said latch mechanism; and a field effect apparatus which responds to movement of said ejector between said first and second positions by providing a first output if said ejector is in said first position and a second, different output if said ejector is in said second position.

11. Apparatus as defined in claim 10 further comprising a vehicle occupant protection device which deploys upon the occurrence of a predetermined vehicle condition, said protection device deploying in a first mode in response to said first output and in a second, different mode in response to said second output.

12. Apparatus as defined in claim 10 further comprising a vehicle occupant protection device which deploys upon the occurrence of a predetermined vehicle condition when said field effect apparatus provides one of said outputs, and which does not deploy when said field effect apparatus provides the other of said outputs.

* * * * *